(12) United States Patent
Kulkarni et al.

(10) Patent No.: US 12,436,820 B2
(45) Date of Patent: Oct. 7, 2025

(54) METHOD HIGH PERFORMANCE COMPUTING APPLICATION TO SERVERLESS PLATFORM

(71) Applicant: Tata Consultancy Services Limited, Mumbai (IN)

(72) Inventors: Rajesh Gopalrao Kulkarni, Pune (IN); Amit Kalele, Pune (IN); Dheeraj Chahal, Pune (IN); Pradeep Gameria, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 527 days.

(21) Appl. No.: 18/163,721

(22) Filed: Feb. 2, 2023

(65) Prior Publication Data
US 2023/0401087 A1  Dec. 14, 2023

(30) Foreign Application Priority Data
Jun. 14, 2022 (IN) .............................. 202221034103

(51) Int. Cl.
*G06F 9/50* (2006.01)
*G06F 9/455* (2018.01)
*G06F 9/48* (2006.01)

(52) U.S. Cl.
CPC ............ *G06F 9/5088* (2013.01); *G06F 9/455* (2013.01); *G06F 9/45504* (2013.01);
(Continued)

(58) Field of Classification Search
CPC .. G06F 9/455; G06F 9/45504; G06F 9/45533; G06F 9/48; G06F 9/4806;
(Continued)

(56) References Cited

U.S. PATENT DOCUMENTS 10,616,127 B1 *   4/2020   Suit ......................... H04L 47/70
11,861,362 B1 *   1/2024   Zhang .................. G06F 9/45558
(Continued)

OTHER PUBLICATIONS

Anirban Bhattacharjee et al., "BARISTA: Efficient and Scalable Serverless Serving System for Deep Learning Prediction Services," Machine Learning, Apr. 2019, Arxiv, https://arxiv.org/pdf/1904.01576.pdf.

(Continued)

*Primary Examiner* — Charles M Swift
(74) *Attorney, Agent, or Firm* — Finnegan, Henderson, Farabow, Garrett & Dunner LLP (57) ABSTRACT

Migrating application from on premise HPC cluster to serverless platform is tedious task and involves significant amount of human efforts as cloud infrastructure needs to be created, data along with libraries and application code need to be copied from on-premise to cloud, and application need to be made compliant for execution on cloud. Present disclosure provides method and system for performing automated migration of high performance computing application to serverless platform. The system first check cloud readiness of application based on operation qualification parameters of application. In case application is found to be cloud ready, the system determines whether application can be executed on serverless platform based on execution time of the application and permissible limits defined for application in service level agreements. Once the application is found to be executable on the serverless platform, the system performs automatic migration of the application to serverless platform using infrastructure automation engine.

19 Claims, 5 Drawing Sheets

(52) U.S. Cl.
CPC ............ *G06F 9/45533* (2013.01); *G06F 9/48* (2013.01); *G06F 9/4806* (2013.01); *G06F 9/4843* (2013.01); *G06F 9/485* (2013.01); *G06F 9/4856* (2013.01); *G06F 9/4862* (2013.01); *G06F 9/4875* (2013.01); *G06F 9/4881* (2013.01); *G06F 9/50* (2013.01); *G06F 9/5005* (2013.01); *G06F 9/505* (2013.01); *G06F 9/5061* (2013.01); *G06F 9/5077* (2013.01); *G06F 9/5083* (2013.01)

(58) Field of Classification Search
CPC ...... G06F 9/4843; G06F 9/485; G06F 9/4856; G06F 9/4862; G06F 9/4875; G06F 9/4881; G06F 9/50; G06F 9/5005; G06F 9/505; G06F 9/5061; G06F 9/5077; G06F 9/5083; G06F 9/5088
See application file for complete search history.

(56) References Cited

U.S. PATENT DOCUMENTS

| | | | |
|---|---|---|---|
| 2016/0094477 A1* | 3/2016 | Bai | H04L 47/786 709/226 |
| 2016/0098292 A1* | 4/2016 | Boutin | G06F 9/4881 718/104 |
| 2017/0039090 A1* | 2/2017 | Devarakonda | G06F 9/4856 |
| 2017/0149875 A1* | 5/2017 | Iyengar | H04L 47/83 |
| 2017/0169336 A1* | 6/2017 | Singhal | G06F 16/90335 |
| 2017/0364387 A1* | 12/2017 | Ahmed | G06F 3/0605 |
| 2020/0174815 A1* | 6/2020 | Ramesh | G06F 9/45558 |
| 2020/0174830 A1* | 6/2020 | Hermenier | H04L 67/101 |
| 2020/0304571 A1* | 9/2020 | Ranjan | G06F 3/0649 |
| 2022/0334870 A1* | 10/2022 | Chen | G06F 9/4856 |
| 2023/0188613 A1* | 6/2023 | Velammal | G06F 8/72 709/203 |

OTHER PUBLICATIONS

Anupama Mampage et al., "A Holistic View on Resource Management in Serverless Computing Environments: Taxonomy and Future Directions," Distributed, Parallel, and Cluster Computing, Jun. 2021, Arxiv, https://arxiv.org/pdf/2105.11592.pdf.

* cited by examiner

FIG. 3 receiving, by an application migration system via one or more hardware processors, one or more applications that are to be migrated on a serverless platform and a configuration file associated with each application of the one or more applications, wherein the configuration file associated with each application of the one or more applications comprises a plurality of parameters  402 determining, by the application migration system via the one or more hardware processors, suitability of each application of the one or more applications for serverless platform migration by iteratively performing:  404 determining, by the application migration system via the one or more hardware processors, whether a first application of the one or more applications is eligible for serverless platform migration based on the plurality of parameters of the first application using a machine learning based application qualification model  404a upon determining that the first application is eligible for serverless platform migration, computing, by the application migration system via the one or more hardware processors, an execution time of the first application when running on the serverless platform based on the plurality of parameters of the first application using a machine learning based runtime prediction model  404b determining, by the application migration system via the one or more hardware processors, whether the first application is executable on the serverless platform based, at least in part, on the computed execution time and one or more permissible limits, wherein the one or more permissible limits are accessed from the configuration file associated with the first application  404c

METHOD HIGH PERFORMANCE COMPUTING APPLICATION TO SERVERLESS PLATFORM

PRIORITY CLAIM

This U.S. patent application claims priority under 35 U.S.C. § 119 to: Indian Patent Application No. 202221034103, filed on 14 Jun. 2022. The entire contents of the aforementioned application are incorporated herein by reference.

TECHNICAL FIELD

The disclosure herein generally relates to application migration, and, more particularly, to a method and a system for automated migration of high performance computing application to serverless platform.

BACKGROUND

Traditionally, high performance computing (HPC) applications are executed on one or more on premise clusters as the execution time of these applications/task range from few hours to few days. Further, multiple servers are required to execute these applications/tasks. Recently, many cloud providers started providing HPC instances and have made it feasible to port HPC applications on these instances.

Though, with the launch of serverless instances, the user gets the advantage of pay-per-execution model i.e., the user just has to pay for the time the code was executed on the instance. However, migrating applications from on premise HPC cluster to a serverless platform is a tedious task and involves significant amount of human efforts like creating cloud infrastructure, copying all the data along with libraries and application code from the on-premise to the cloud, and making the application compliant for execution on the cloud. Currently, there is no system available that can perform all the work associated with the migration in one go.

Further, the HPC applications are generally long running, and compute and memory intensive. So, these characteristics of the HPC applications make migration to the serverless platform further challenging as the serverless platforms have some inherent constraints such as a short lifetime, limited compute power and statelessness. Thus, finding suitability of the HPC application for migration to the serverless platform before actually deploying the application becomes equally important as performing migration using current systems involves a lot of manual work and time that will go waste and the user also has to pay for time the code is executed on the serverless platform without obtaining any end results.

SUMMARY

Embodiments of the present disclosure present technological improvements as solutions to one or more of the above-mentioned technical problems recognized by the inventors in conventional systems. For example, in one aspect, there is provided a processor implemented method for automated migration of high performance computing application to serverless platform. The method comprises receiving, by an application migration system via one or more hardware processors, one or more applications that are to be migrated on a serverless platform and a configuration file associated with each application of the one or more applications, wherein the configuration file associated with each application of the one or more applications comprises a plurality of parameters; determining, by the application migration system via the one or more hardware processors, suitability of each application of the one or more applications for serverless platform migration by iteratively performing: determining, by the application migration system via the one or more hardware processors, whether a first application of the one or more applications is eligible for serverless platform migration based on the plurality of parameters of the first application using a machine learning based application qualification model; upon determining that the first application is eligible for serverless platform migration, computing, by the application migration system via the one or more hardware processors, an execution time of the first application when running on the serverless platform based on the plurality of parameters of the first application using a machine learning based runtime prediction model; determining, by the application migration system via the one or more hardware processors, whether the first application is executable on the serverless platform based, at least in part, on the computed execution time and one or more permissible limits, wherein the one or more permissible limits are accessed from the configuration file associated with the first application; upon determining that the first application is executable on the serverless platform, calculating, by the application migration system via the one or more hardware processors, a running cost of the first application on the serverless platform based, at least in part, on the computed execution time and a compute capacity of the serverless platform, wherein the compute capacity of the serverless platform is accessed from a serverless platform configuration file; storing, by the application migration system via the one or more hardware processors, the running cost of the first application in a database; adding, by the application migration system via the one or more hardware processors, the first application in a suitable application queue; and identifying, by the application migration system via the one or more hardware processors, a second application in the one or more applications as the first application, until the suitability of all applications in the one or more applications is determined; and performing, by the application migration system via the one or more hardware processors, automatic migration of each application present in the suitable application queue to the serverless platform using an infrastructure automation engine, wherein each migrated application is configured to run on the serverless platform.

In another aspect, there is provided an application migration system for automated migration of high performance computing application to serverless platform. The system comprises a memory storing instructions; one or more communication interfaces; and one or more hardware processors coupled to the memory via the one or more communication interfaces, wherein the one or more hardware processors are configured by the instructions to: receive one or more applications that are to be migrated on a serverless platform and a configuration file associated with each application of the one or more applications, wherein the configuration file associated with each application of the one or more applications comprises a plurality of parameters; determine suitability of each application of the one or more applications for serverless platform migration by iteratively performing: determining whether a first application of the one or more applications is eligible for serverless platform migration based on the plurality of parameters of the first application using a machine learning based application qualification model; upon determining that the first application is eligible for serverless platform migration, computing an execution time of the first application when running on the serverless platform based on the plurality of parameters of the first application using a machine learning based runtime prediction model; determining whether the first application is executable on the serverless platform based, at least in part, on the computed execution time and one or more permissible limits, wherein the one or more permissible limits are accessed from the configuration file associated with the first application; upon determining that the first application is executable on the serverless platform, calculating a running cost of the first application on the serverless platform based, at least in part, on the computed execution time and a compute capacity of the serverless platform, wherein the compute capacity of the serverless platform is accessed from a serverless platform configuration file; storing the running cost of the first application in a database; adding the first application in a suitable application queue; and identifying a second application in the one or more applications as the first application, until the suitability of all applications in the one or more applications is determined; and perform automatic migration of each application present in the suitable application queue to the serverless platform using an infrastructure automation engine, where each migrated application is configured to run on the serverless platform.

In yet another aspect, there are provided one or more non-transitory machine-readable information storage mediums comprising one or more instructions which when executed by one or more hardware processors cause a method for automated migration of high performance computing application to serverless platform. The method comprises receiving, by an application migration system, one or more applications that are to be migrated on a serverless platform and a configuration file associated with each application of the one or more applications, wherein the configuration file associated with each application of the one or more applications comprises a plurality of parameters; determining, by the application migration system, suitability of each application of the one or more applications for serverless platform migration by iteratively performing: determining, by the application migration system, whether a first application of the one or more applications is eligible for serverless platform migration based on the plurality of parameters of the first application using a machine learning based application qualification model; upon determining that the first application is eligible for serverless platform migration, computing, by the application migration system, an execution time of the first application when running on the serverless platform based on the plurality of parameters of the first application using a machine learning based runtime prediction model; determining, by the application migration system, whether the first application is executable on the serverless platform based, at least in part, on the computed execution time and one or more permissible limits, wherein the one or more permissible limits are accessed from the configuration file associated with the first application; upon determining that the first application is executable on the serverless platform, calculating, by the application migration system, a running cost of the first application on the serverless platform based, at least in part, on the computed execution time and a compute capacity of the serverless platform, wherein the compute capacity of the serverless platform is accessed from a serverless platform configuration file; storing, by the application migration system, the running cost of the first application in a database; adding, by the application migration system, the first application in a suitable application queue; and identifying, by the application migration system, a second application in the one or more applications as the first application, until the suitability of all applications in the one or more applications is determined; and performing, by the application migration system, automatic migration of each application present in the suitable application queue to the serverless platform using an infrastructure automation engine, wherein each migrated application is configured to run on the serverless platform.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Generally, high performance computing (HPC) applications require multiple servers for execution and the execution time of these applications is also high i.e., they run from few hours to few days. Serverless platforms, such as Amazon Web Services (AWS) Lambda®, Microsoft Azure functions®, Google cloud platform (GCP)® etc., are emerging as a preferred choice for executing applications due to its high scalability and pay-per-use cost model. However, performing migration of HPC applications from on premise to the serverless platform involves a lot of manual works that needs to be done like creation of infrastructure on the cloud, copying the data from on-premises to cloud and making HPC application compliant (including resolving the software dependency) for execution on cloud. Further, the serverless platforms have some inherent constraints such as a short lifetime, limited compute power and statelessness, thereby performing migration of every HPC application is not achievable.

To address the above technical problem, a method and a system for automated migration of high performance computing application to serverless platform is provided. The system first determines suitability of an application for serverless platform migration by first determining eligibility of the application based on a plurality of parameters of the application, such as processing requirement of the application, memory requirement of the application, data size of the application, transfer time requirement of the application, workflow complexity of the application, security requirement of the application, and license requirement of the application. Once the application if found to be eligible, the system computes an execution time of the application when running on the serverless platform based on the plurality of parameters of the application. The system then determines whether the application is executable on the serverless platform based on the computed execution time and one or more permissible limits defined for the application. Upon determining that the application is executable on the serverless platform, the system consider the application suitable for serverless platform migration. Thereafter, the system calculates a running cost of the application on the serverless platform based on the computed execution time and a compute capacity of the serverless platform to determine the cost affordability of running the application on the serverless public cloud instance. Further, the system performs automatic migration of the application to the serverless platform using an infrastructure automation engine that handles the migration of the application along with data required for running the application on a public cloud serverless instance.

In the present disclosure, the system and the method perform automated migration of HPC application from on-premise to cloud i.e., the system handles everything from serverless compute infra preparation to application porting, thereby eliminating need of performing manual work, such as creation of infrastructure, copying of data from on-premises to cloud and making application compliant, which further reduces the time taken in performing application migration. Further, the system and the method calculate the running cost of the application on the serverless platform, thereby helping a user in taking decision about migration of application before actually migrating the application on cloud.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

Figure 1:
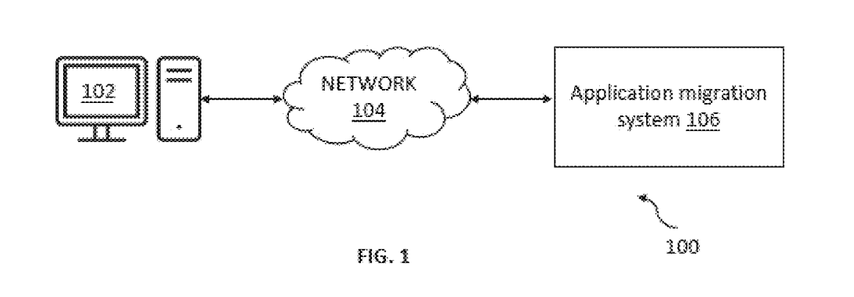
FIG. 1 is an example representation of an environment, related to at least some example embodiments of the present disclosure.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, determining suitability of application, performing automated migration of application on cloud, etc. The environment 100 generally includes an electronic device, such as an electronic device 102, and an application migration system 106, each coupled to, and in communication with (and/or with access to) a network 104. It should be noted that one electronic device is shown for the sake of explanation; there can be more number of electronic devices.

The network 104 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof.

Various entities in the environment 100 may connect to the network 104 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof.

The electronic device 102 is associated with an organization who is maintaining a high performance computing (HPC) scheduler and an on premise cluster for execution of the HPC applications. In an embodiment, the HPC scheduler is configured to 1) receive the application jobs submitted by a plurality of users for running the application jobs on the on premise cluster, and 2) submit the application jobs to the on-premise cluster. The HPC scheduler is also configured to transfer an application job in a pending state in the HPC scheduler if computing resources are not available in the on premise cluster for servicing of the application job. In an embodiment, the application jobs available in the pending state can be migrated to serverless platform for execution. Examples of the electronic device 102 include, but are not limited to, a personal computer (PC), a mobile phone, a tablet device, a Personal Digital Assistant (PDA), a server, a voice activated assistant, a smartphone, and a laptop.

The application migration system 106 includes one or more hardware processors and a memory. The application migration system 106 is configured to perform one or more of the operations described herein. The application migration system 106 is configured to communicate with the electronic device 102 via the network 104 to receive one or more applications that are to be migrated on a serverless platform and a configuration file associated with each application of the one or more applications. In an embodiment, the application migration system 106 receives only those applications from the electronic device 102 that are lying in the pending state in the HPC scheduler. The plurality of parameters associated with each application includes one or more of processing requirement of an application, memory requirement of the application, data size of the application, transfer time requirement of the application, workflow complexity of the application, security requirement of the application, license requirement of the application, user defined parameter associated with the application and service level agreements (SLAs) associated with the application.

The application migration system 106 is then configured to check cloud readiness of each application of the one or more application. For checking cloud readiness of each application, the application migration system 106 determines whether each application is eligible for serverless platform migration based on the plurality of parameters of the respective application using a machine learning based application qualification model. The applications that are found to be eligible for serverless platform migration are processed further by the program transformation system 106 and the applications that are found to be in eligible are sent back to the HPC scheduler present in the electronic device 102.

Thereafter, the application migration system 106 is configured to predict run time of each eligible application by computing an execution time of the respective application based on the plurality of parameters of the respective application using a machine learning based runtime prediction model. Once the execution time of each eligible application is computed, the application migration system 106 is configured to determine whether each application is executable on the serverless platform based on the computed execution time of the respective application and one or more permissible limits defined for the respective application. It should be noted that the one or more permissible limits are generally specific to the application and the public cloud service provider. The applications that are found to be executable on the serverless platform are processed further by the program transformation system 106 and the applications that are found to be inexecutable on the serverless platform are sent back to the HPC scheduler present in the electronic device 102.

Further, the application migration system 106 is configured to calculate a running cost of each executable application on the serverless platform based on the computed execution time and a compute capacity of the serverless platform. In an embodiment, the application migration system 106 is configured to determine whether any executable application needs scaling based on an occurrence of at least one event in the respective application. Once it is determined that an application needs scaling, the application migration system 106 determines whether scaling needs to be done for the application based on the calculated running cost of the respective application, a priority of the respective application and one or more parameters of the plurality of parameters of the respective application using a machine learning based scaling model. In case it is determined that the scaling needs to be done, the application migration system 106 calculates a number of server instances to be spawned for the application and allocate the calculated number of server instances to the application.

Finally, the application migration system 106 performs automatic migration of each executable application on the serverless platform using an infrastructure automation engine. The infrastructure automation engine automates the process of migration from on-premise deployment to the serverless platform i.e., it performs all the steps that are required to migrate the application to the serverless platform, such as deploying all dependencies of the application, configuring serverless instances, setting virtual private cloud and internet gateways and the like.

Once the executable applications are migrated to the serverless platform, the executable applications are configured to run on the serverless platform.

In an embodiment, the application migration system 106 is also configured to send back the execution results of the executable applications to the electronic device 102 for the users to view.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100 (e.g., refer scenarios described above).

Figure 2:
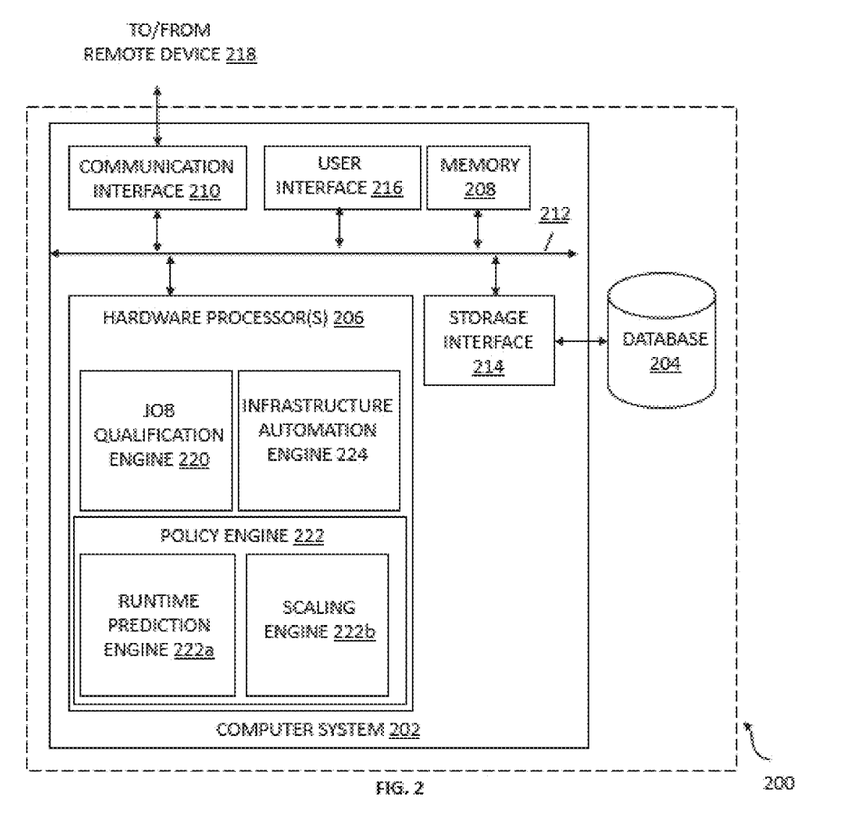
FIG. 2 illustrates an exemplary block diagram of a system for automated migration of high performance computing application to a serverless platform, in accordance with an embodiment of the present disclosure.

FIG. 2 illustrates an exemplary block diagram of an application migration system 200 for performing automated migration of high performance computing application to a serverless platform, in accordance with an embodiment of the present disclosure. In an embodiment, the application migration system 200 may also be referred as system 200 and may be interchangeably used herein. The system 200 is similar to the application migration system 106 explained with reference to FIG. 1. In some embodiments, the system 200 is embodied as a cloud-based and/or SaaS-based (software as a service) architecture. In some embodiments, the system 200 may be implemented in a server system. In some embodiments, the system 200 may be implemented in a variety of computing systems, such as laptop computers, notebooks, hand-held devices, workstations, mainframe computers, and the like.

The system 200 includes a computer system 202 and a system database 204. The computer system 202 includes one or more processors 206 for executing instructions, a memory 208, a communication interface 210, and a user interface 216 that communicate with each other via a bus 212.

The memory 208 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the system database 204 can be stored in the memory 208, wherein the system database 204 may comprise, but are not limited to, configuration files associated with each application, a serverless platform configuration file, a machine learning based application qualification model, a machine learning based runtime prediction model, a machine learning based scaling model, and the like. The memory 208 further comprises (or may further comprise) information pertaining to input(s)/output(s) of each step performed by the systems and methods of the present disclosure. In other words, input(s) fed at each step and output(s) generated at each step are comprised in the memory 208 and can be utilized in further processing and analysis.

In some embodiments, the system database 204 is integrated within computer system 202. For example, the computer system 202 may include one or more hard disk drives as the system database 204. A storage interface 214 is any component capable of providing the one or more processors 206 with access to the system database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the one or more processors 206 with access to the system database 204. In one embodiment, the system database 204 is similar to the database explained with reference to FIG. 1.

The one or more processors 206 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory 208.

The one or more processors 206 are operatively coupled to the communication interface 210 such that the one or more processors 206 communicate with a remote system 218 such as, the electronic device 102, or communicated with any entity connected to the network 104. Further, the one or more processors 206 are operatively coupled to the user interface 216 for interacting with plurality of users who has submitted their application jobs for running on the serverless platform. In an embodiment, a migration status of each application is displayed on the user interface 216.

It is noted that the system 200 as illustrated and hereinafter described is merely illustrative of an apparatus that could benefit from embodiments of the present disclosure and, therefore, should not be taken to limit the scope of the present disclosure. It is noted that the system 200 may include fewer or more components than those depicted in FIG. 2.

In one embodiment, the one or more processors 206 includes a job qualification engine 220, a policy engine 222, and an infrastructure automation engine 224.

The job qualification engine 220 includes suitable logic and/or interfaces for receiving one or more applications that are to be migrated on a serverless platform and a configuration file associated with each application of the one or more applications from the electronic device 102. The configuration file associated with each application of the one or more applications includes a plurality of parameters. In an embodiment, the plurality of parameters includes one or more of processing requirement of an application, memory requirement of the application, data size of the application, transfer time requirement of the application, workflow complexity of the application, security requirement of the application, license requirement of the application, user defined parameter associated with the application and service level agreements (SLAs) associated with the application.

In one embodiment, the job qualification engine 220 is configured to determine whether each application of the one or more applications is eligible for serverless platform migration based on the plurality of parameters of the corresponding application using the machine learning based application qualification model. More specifically, the job qualification engine 220 checks the cloud readiness of each application based one or more operational qualification parameters of the respective application using the machine learning based application qualification model. In an embodiment, the one or more operational qualification parameters includes one or more of the processing requirement(s) of the application, the memory requirement of the application, the data size of the application, the transfer time requirement of the application, the workflow complexity of the application, the security requirement of the application, and the license requirement of the application.

In at least one example embodiment, the machine learning based application qualification model is a trained model. In particular, the machine learning based application qualification model is trained using one of a random forest classifier (RFC) algorithm and a support vector classifier (SVC) algorithm.

In an embodiment, applications of the one or more applications that pass assessment of the job qualification engine 220 i.e., the applications that are found to be eligible for the serverless platform migration are sent to the policy engine 222 and rest of the applications are sent back to the electronic device 102 i.e., to an on premise cluster queue for further processing. Basically, the rest of the applications are first added to a non-suitable application queue from where the applications are sent back to the on premise cluster queue. Once the applications are sent back to the on premise cluster queue, the hardware processors 206 are configured to change migration status of the applications in the system database 204 i.e., the migration status of the application is changed to 'unsuccessful migration'.

The policy engine 222 is in communication with the job qualification engine 220. The policy engine 222 includes suitable logic and/or interfaces for receiving the applications that are found to be eligible (also referred as eligible applications) for the serverless platform migration from the job qualification engine 220. The policy engine 222 is also configured to access configuration files associated with each application of the eligible applications.

In an embodiment, the policy engine 222 includes a runtime prediction engine 222a and a scaling engine 222b. The runtime prediction engine 222a is configured to test technical qualifications of each eligible application using the machine learning based runtime prediction model. More specifically, the runtime prediction engine 222a first computes an execution time of each eligible application when running on the serverless platform based on the plurality of parameters of the eligible application using the machine learning based runtime prediction model. Then, the calculated execution time of each eligible application along with the one or more permissible limits of the respective eligible application are used to determine whether the eligible application is executable on the serverless platform. In general, the eligible applications that have a low execution time as well as resource demand, are considered suitable for the serverless platform migration.

The eligible applications that are also found to be executable (also referred as executable applications) on the serverless platform are further processed by the runtime prediction engine 222a and the rest of the edible applications are sent back to the electronic device 102 i.e., to the on premise cluster queue for further processing. In at least one example embodiment, the runtime prediction engine 222a is configured to add the executable applications in a suitable application queue maintained by the system 200.

In one embodiment, the runtime prediction engine 222a is also configured to compute a running cost of each executable application on the serverless platform based on the computed execution time of the respective executable application and a compute capacity of the serverless platform. In an embodiment, the compute capacity of the serverless platform is accessed from a serverless platform configuration file maintained in the system database 204. In general, the compute capacity of the serverless platform is proportional to a memory provisioned for cloud instance. So, a product of the compute capacity and the computed execution time is taken to compute the running cost of an executable application that further helps in performing performance and cost trade-off studies. Additionally, the runtime prediction engine 222a is configured to store the running cost of each executable application in the system database 204.

The scaling engine 222b is in communication with the runtime prediction engine 222a. For each executable application, the scaling engine 222b is configured to determine whether an executable application needs scaling based on an occurrence of at least one event in the respective executable application. In an embodiment, the at least one event can occur during the execution of the executable application and causes the executable application to scale out i.e., the executable application may require large number of serverless instances for running on the serverless platform.

Thereafter, for each executable application that needs scaling, the scaling engine 222b is configured to determine whether scaling needs to be done for the executable application based on a running cost of the respective executable application, and a priority of the respective executable application and one or more parameters, such as SLAs associated with the executable application or any user defined parameter using a trained machine learning based scaling model. Once it is determined that the scaling needs to be done for an executable application, the scaling engine 222b calculates a number of server instances to be spawned for the executable application based on the at least one event that has occurred. The calculated number of server instances are then allocated by the infrastructure automation engine 224 to the executable application.

The infrastructure automation engine 224 includes suitable logic and/or interfaces for accessing the suitable application queue maintained by the system 200. The infrastructure automation engine 224 is configured to perform automatic migration of each application present in the suitable application queue to the serverless platform. For performing automatic migration, the infrastructure automation engine 224 is first configured to create one or more serverless functions for each executable application present in the suitable application queue. The one or more serverless functions created for each executable application include application code associated with the respective executable application. Then, the infrastructure automation engine 224 is configured to perform tagging of each serverless function of the one or more serverless functions to one of a virtual network and an expandable file system present in the serverless platform i.e., public cloud. Thereafter, the infrastructure automation engine 224 is configured to perform refactoring of the application code present in the one or more serverless functions created for each executable application for execution on a public cloud environment. Further, the infrastructure automation engine 224 deploys the one or more serverless functions created for each executable application on the serverless platform. The serverless platform then executes the one or more serverless functions on the public cloud environment associated with a public cloud. In case the additional number of server instances are allocated to any executable application, the serverless platform uses the allocated number of server instances for running the same executable application.

Figure 3:
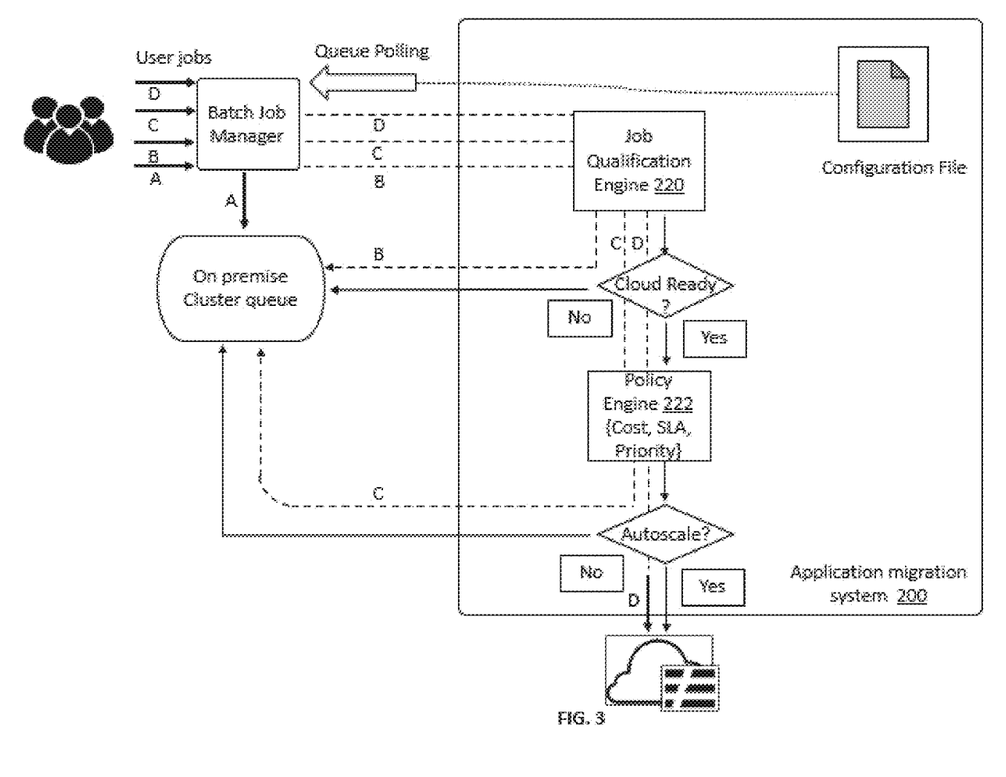
FIG. 3 illustrates a schematic block diagram representation of an application migration process for automated migration of high performance computing application to the serverless platform, in accordance with an embodiment of the present disclosure.

FIG. 3, with reference to FIGS. 1-2, illustrates a schematic block diagram representation 300 of an application migration process associated with the system 200 of FIG. 2 or the application migration system 106 of FIG. 1 for automated migration of high performance computing application to the serverless platform, in accordance with an embodiment of the present disclosure.

As seen in FIG. 3, the system 200 receives a plurality of application jobs from a batch job manager that is responsible for maintaining an on premise cluster queue and a pending queue. In particular, the system 200 receives the application jobs that are present in the pending queue. Thereafter, the job qualification engine 220 of the system 200 check the cloud readiness of each application jobs of the plurality of application jobs based on one or more operational qualification parameters of the respective application job. Application jobs that pass assessment of the job qualification engine 220 are sent to the policy engine 222 and the rest of the jobs are returned to the on premise cluster queue.

Thereafter, the policy engine 222 determines an execution time of each application job that is further utilized to decide whether the respective job can be executed on the serverless platform. Application jobs that are found eligible for execution are moved to the next stage or further processing while all the discarded application jobs are sent back in the on premise cluster for processing on the on premise. The policy engine 222 then checks whether any of the eligible application job requires scaling. For the application jobs that need scaling, the policy engine 222 decides the number of serverless instances to be spawned for each application job and the same number of serverless instances are allocated to the corresponding application job Further, the infrastructure automation engine 224 automates the process of migration of the eligible application jobs from the on premise deployment to the serverless platform.

Figure 4A:
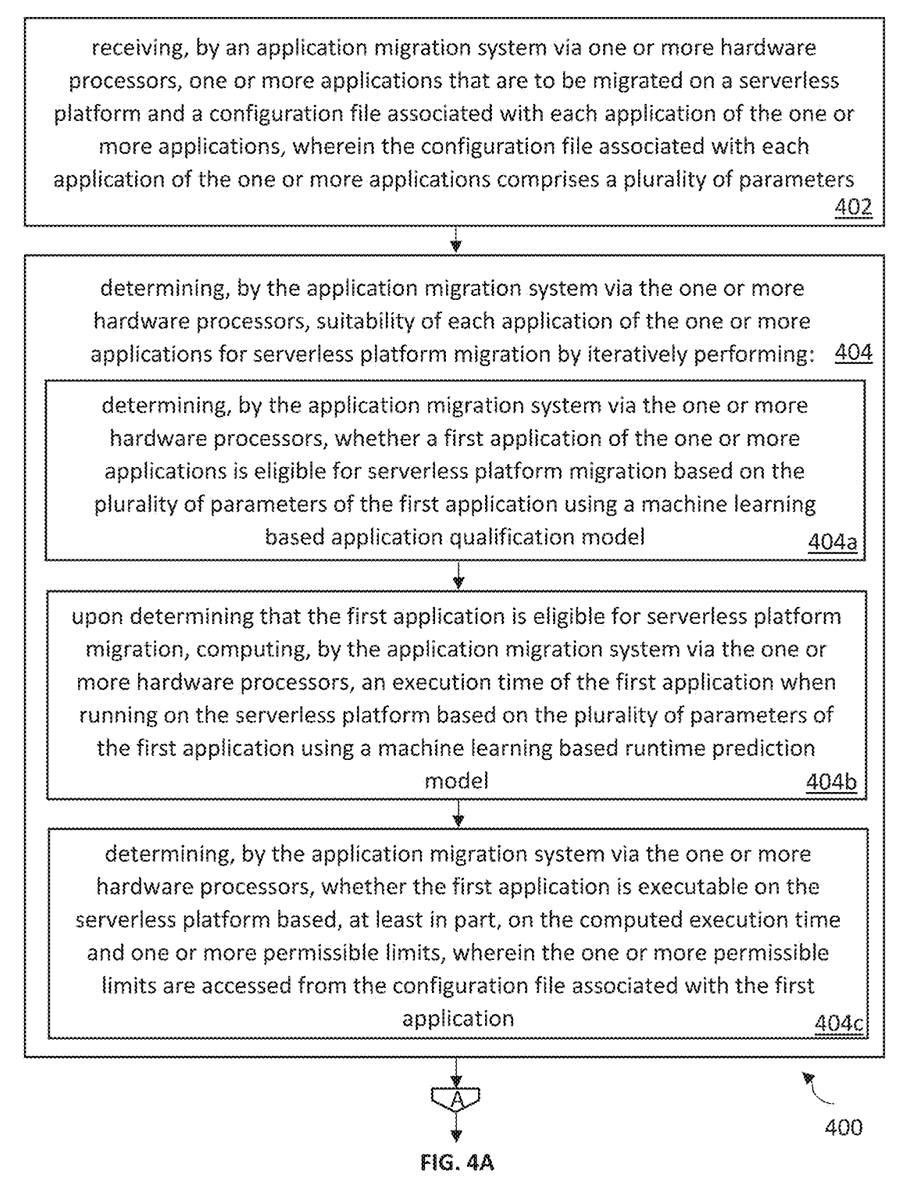
FIGS. 4A and 4B, collectively, represent an exemplary flow diagram of a method for automated migration of high performance computing application to the serverless platform, in accordance with an embodiment of the present disclosure.
Figure 4B:
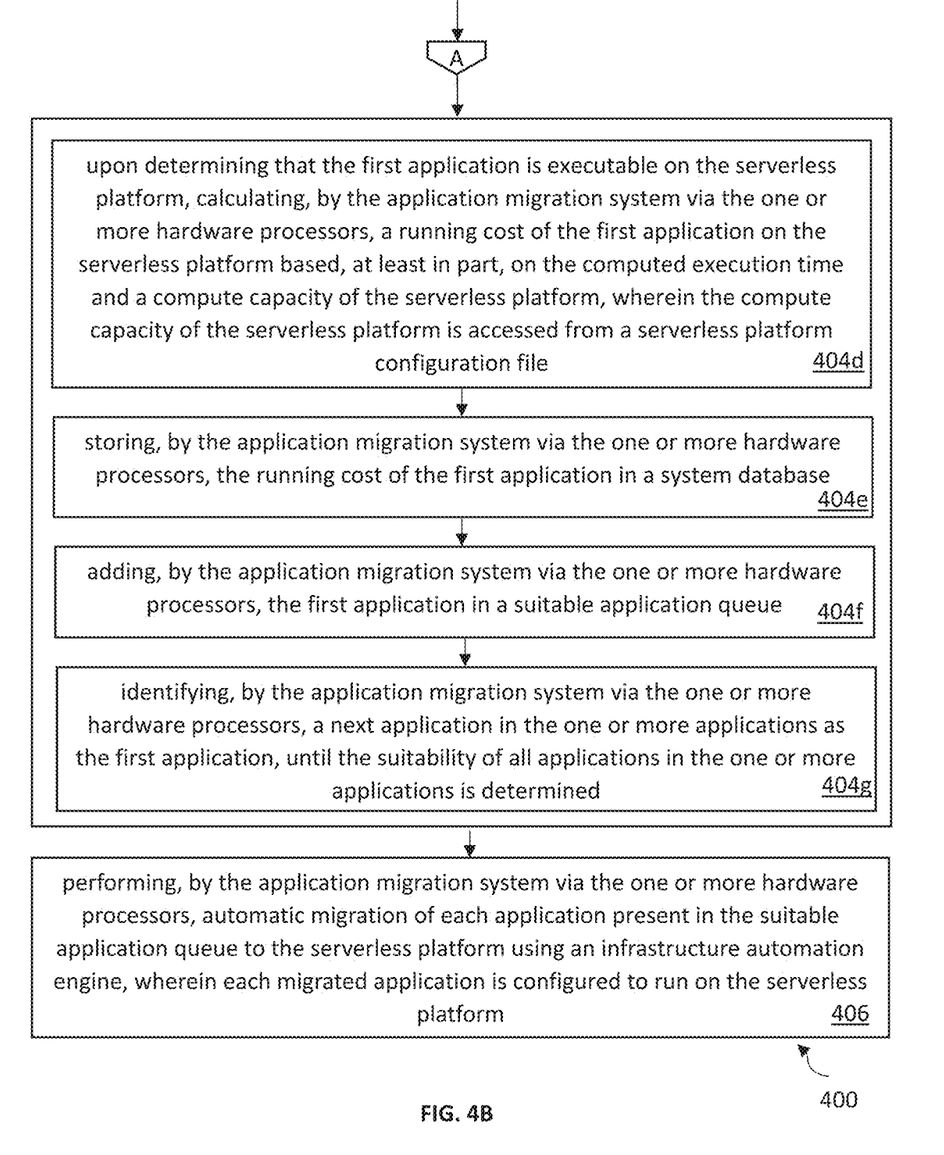

FIGS. 4A and 4B, with reference to FIGS. 1 through 3, collectively, illustrate an exemplary flow diagram of a method 400 for performing automated migration of high performance computing application to the serverless platform, in accordance with an embodiment of the present disclosure. The method 400 may use the system 200 of FIG. 2 and application migration system 106 of FIG. 1 for execution. In an embodiment, the system 200 comprises one or more data storage devices or the memory 202 operatively coupled to the one or more hardware processors 204 and is configured to store instructions for execution of steps of the method 400 by the one or more hardware processors 204. The sequence of steps of the flow diagram may not be necessarily executed in the same order as they are presented. Further, one or more steps may be grouped together and performed in form of a single step, or one step may have several sub-steps that may be performed in parallel or in sequential manner. The steps of the method of the present disclosure will now be explained with reference to the components of the system 200 as depicted in FIG. 2, and the application migration system of FIG. 1.

In an embodiment of the present disclosure, at step 402, the one or more hardware processors 206 of the system 200 receive one or more applications that are to be migrated on a serverless platform and a configuration file associated with each application of the one or more applications. In an embodiment, the hardware processors 206 may be configured to poll the HPC scheduler present in the electronic device 102 at a pre-defined interval for receiving the applications that are present in the pending state.

The configuration file associated with each application of the one or more applications includes a plurality of parameters. In an embodiment, the plurality of parameters associated with each application include one or more of processing requirement of an application, memory requirement of the application, data size of the application, transfer time requirement of the application, workflow complexity of the application, security requirement of the application, license requirement of the application, user defined parameter associated with the application and service level agreements (SLAs) associated with the application.

At step 404 of the present disclosure, the one or more hardware processors 206 of the system 200 determine suitability of each application of the one or more applications for serverless platform migration by iteratively performing a plurality of steps 404a through 404g until the suitability of all applications in the one or more applications is determined.

More specifically, at step 404a of the present disclosure, the one or more hardware processors 206 of the system 200 determine whether a first application of the one or more applications is eligible for serverless platform migration based on the plurality of parameters of the first application using a machine learning based application qualification model. In particular, the hardware processors 206 of the system 200 first access one or more operational qualification parameters of the first application from the plurality of parameters. In an embodiment, the one or more operational qualification parameters that are accessed includes one or more of the processing requirement of the first application, the memory requirement of the first application, the data size of the first application, the transfer time requirement of the first application, the workflow complexity of the first application, the security requirement of the first application, and the license requirement of the first application. Thereafter, the hardware processors 206 of the system 200 check whether the first application is eligible for the serverless platform migration based on the one or more operational qualification parameters of the first application using the trained machine learning based application qualification model.

At step 404b of the present disclosure, the one or more hardware processors 206 of the system 200, upon determining that the first application is eligible for serverless platform migration, compute an execution time of the first application when running on the serverless platform based on the plurality of parameters of the first application using a machine learning based runtime prediction model. In an embodiment, the machine learning based runtime prediction model uses historical data like input data size, compute memory required by the application, and other application specific parameters for execution time computation.

At step 404c of the present disclosure, the one or more hardware processors 206 of the system 200 determine whether the first application is executable on the serverless platform based, at least in part, on the computed execution time and one or more permissible limits that are accessed from a configuration file associated with the first application. In particular, if the computed execution time is found to be within permissible limits of the first application, the first application is considered as executable on the serverless platform.

At step 404d of the present disclosure, the one or more hardware processors 206 of the system 200, upon determining that the first application is executable on the serverless platform, calculate a running cost of the first application on the serverless platform based, at least in part, on the computed execution time and a compute capacity of the serverless platform that is accessed from the serverless platform configuration file. In an embodiment, the compute capacity is proportional to the provisioned memory for the serverless instance. So, a product of compute capacity and computed execution time is calculated to find the running cost for the execution of the first application. The running cost further helps in making performance and cost trade-off decisions.

At step 404e of the present disclosure, the one or more hardware processors 206 of the system 200 store the running cost of the first application in a system database, such as the system database 204.

At step 404f of the present disclosure, the one or more hardware processors 206 of the system 200 add the first application in a suitable application queue maintained by the system 200. In particular, the applications among the one or more applications that are found suitable for serverless platform migration are added in the suitable application queue.

In an embodiment, in case it is determined that the first application is not eligible for the serverless platform migration, or it is determined that the first application is not executable on the serverless platform, the one or more hardware processors 206 of the system 200 add the first application in a non-suitable application queue maintained by the system 200. In particular, the applications among the one or more applications that are found not eligible for serverless platform migration or not executable on the serverless platform are added in the non-suitable application queue. In one embodiment, for each application that present in the non-suitable application queue, the one or more hardware processors 206 of the system 200 send the application back to an on premise cluster queue maintained in the electronic device 102. Further, the one or more hardware processors 206 of the system 200 change the migration status of the application in the system database 204. In at least one example embodiment, the migration status of each application present in the non-suitable application queue is changed to unsuccessful migration.

At step 404g of the present disclosure, once the suitability of the first application for serverless platform migration is determined, the one or more hardware processors 206 of the system 200 identify a second application i.e., a next application in the one or more applications as the first application i.e., the suitability of the next application is now determined using the steps 404a-404f and the steps 404a-404f will be repeated again until the suitability of all applications in the one or more applications is determined.

At step 406 of the present disclosure, the one or more hardware processors 206 of the system 200 perform automatic migration of each application present in the suitable application queue to the serverless platform using an infrastructure automation engine, such as the infrastructure automation engine 224. Each migrated application is configured to run on the serverless platform. An automatic migration process followed by the infrastructure automation engine for automatic migration of each application present in the suitable application queue is explained in detail with reference to FIG. 2 and the description is not reiterated herein for the sake of brevity.

In an embodiment, the one or more hardware processors 206 of the system 200, for each application present in the suitable application queue, determine whether an application needs scaling based on an occurrence of at least one event in the respective application. In an embodiment, the at least one event can occur during the execution of respective application. In an exemplary scenario, the event can be requirement of simultaneous execution of multiple risk scenario present in a stress testing application using multiple serverless instances.

Upon determining that an application needs scaling, the one or more hardware processors 206 of the system 200 determine whether scaling needs to be done for the application based, at least in part, on a running cost of the respective application, and a priority of the respective application and one or more parameters of the plurality of parameters, such as SLA defined for the respective application using the machine learning based scaling model. In particular, whether the scaling is permitted for the application is determined by taking into consideration the cost factor, SLA's and priority of the application. In case it is determined that the scaling needs to be done for the application, the one or more hardware processors 206 of the system 200 calculate a number of server instances to be spawned for the application based on the at least one event i.e., how many serverless instances are required for execution of the at least one event is determined. Thereafter, the one or more hardware processors 206 of the system 200 allocate the calculated number of server instances for the application and perform the automatic migration of the application on the serverless platform along with the allocated number of server instances for execution of the application.

In an embodiment, for each migrated application, the one or more hardware processors 206 of the system determine whether execution of the migrated application is completed on the serverless platform. Upon determining that the execution is completed on the serverless platform, the one or more hardware processors 206 of the system display a result of the migrated application on an electronic device, such as the electronic device 102 and change the migration status of the application in the system database. In one embodiment, the migration status of the application is changed to successfully migrated.

In at least one example embodiment, the one or more hardware processors 206 of the system access migration status of each application of the one or more applications that are initially received from the system database 204. The migration status of each application is then displayed on the electronic device 102.

Figure 5:
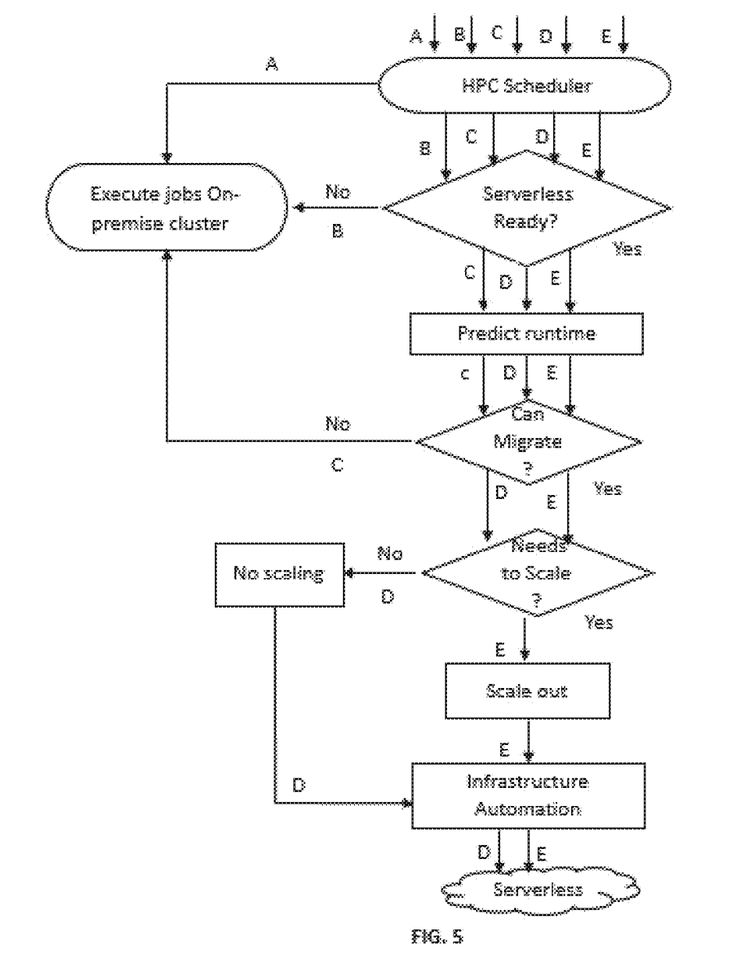
FIG. 5 illustrates a schematic representation of an exemplary scenario, in accordance with an embodiment of the present disclosure.

FIG. 5, with reference to FIGS. 1 through 4, illustrates a schematic representation of an exemplary scenario, in accordance with an embodiment of the present disclosure.

As seen in the FIG. 5, the HPC scheduler receives 5 application jobs viz 'A, B, C, D, E'. The HPC scheduler selects the application job 'A' for execution on the on premise cluster and the rest of the jobs are added to a pending queue. The pending queue i.e., the jobs 'B, C, D, E' is then serviced by the system 200.

So, the jobs 'B, C, D, E' are first accessed by the job qualification engine 220 of the system. The job 'B' cannot clear the assessment, so it is sent back to the on-premise cluster. The rest of the jobs are accessed by the runtime prediction engine 222a of the policy engine 222. The runtime predicted for job 'C' is not within the predefined interval in configuration file, so it is sent back to on-premise cluster. The runtime predicted for job 'D and E' is within the predefined interval in configuration file, so it is sent to scaling engine 222b interacting with the configuration file.

Thereafter, the scaling engine 222b finds out that job 'D' is not required to scale out so without scaling it is served by the infrastructure automation engine 224 and the Job 'E' needs to scale due to an event, so it is allowed to scale out based on the decision taken by the scaling engine 222b and then served by the infrastructure automation engine 224.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

As discussed earlier, performing migration of HPC applications from on premise to the serverless platform involves a lot of manual works that needs to be done for execution on cloud. Further, the serverless platforms have some inherent constraints such as a short lifetime, limited compute power and statelessness, thereby performing migration of every HPC application is not achievable. So, to overcome the disadvantages, embodiments of the present disclosure provide a method and a system for performing automated migration of high performance computing application to the serverless platform. More specifically, the system performs automated migration of HPC application from on-premise to cloud i.e., the system handles everything from serverless compute infra preparation to application porting, thereby eliminating need of performing manual work, such as creation of infrastructure, copying of data from on-premises to cloud and making application compliant, which further reduces the time taken in performing application migration. Further, the system calculates the running cost of the application on the serverless platform, thereby helping a user in taking decision about migration of application before actually migrating the application on the cloud.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
receiving, by an application migration system via one or more hardware processors, one or more applications that are to be migrated on a serverless platform and a configuration file associated with each application of the one or more applications, wherein the configuration file associated with each application of the one or more applications comprises a plurality of parameters;
determining, by the application migration system via the one or more hardware processors, suitability of each application of the one or more applications for serverless platform migration by iteratively performing:
determining, by the application migration system via the one or more hardware processors, whether a first application of the one or more applications is eligible for serverless platform migration based on the plurality of parameters of the first application using a machine learning based application qualification model;
upon determining that the first application is eligible for serverless platform migration, computing, by the application migration system via the one or more hardware processors, an execution time of the first application when running on the serverless platform based on the plurality of parameters of the first application using a machine learning based runtime prediction model;
determining, by the application migration system via the one or more hardware processors, whether the first application is executable on the serverless platform based, at least in part, on the computed execution time and one or more permissible limits, wherein the one or more permissible limits are accessed from the configuration file associated with the first application;
upon determining that the first application is executable on the serverless platform, calculating, by the application migration system via the one or more hardware processors, a running cost of the first application on the serverless platform based, at least in part, on the computed execution time and a compute capacity of the serverless platform, wherein the compute capacity of the serverless platform is accessed from a serverless platform configuration file;
storing, by the application migration system via the one or more hardware processors, the running cost of the first application in a system database;
adding, by the application migration system via the one or more hardware processors, the first application in a suitable application queue; and
identifying, by the application migration system via the one or more hardware processors, a second application in the one or more applications as the first application,
until the suitability of all applications in the one or more applications is determined; and
performing, by the application migration system via the one or more hardware processors, automatic migration of each application present in the suitable application queue to the serverless platform using an infrastructure automation engine, wherein each migrated application is configured to run on the serverless platform.

2. The processor implemented method of claim 1, further comprises:
for each application present in the suitable application queue,
performing:
determining, by the application migration system via the one or more hardware processors, whether an application needs scaling based on an occurrence of at least one event in the respective application;
upon determining that the application needs scaling, determining, by the application migration system via the one or more hardware processors, whether scaling needs to be done for the application based, at least in part, on a running cost of the respective application, and a priority of the respective application and one or more parameters of the plurality of parameters of the respective application using a machine learning based scaling model, wherein the running cost and the priority of the respective application are accessed from the system database;
upon determining that the scaling needs to be done for the application, calculating, by the application migration system via the one or more hardware processors, a number of server instances to be spawned for the application based on the at least one event; and
allocating, by the application migration system via the one or more hardware processors, the calculated number of server instances for the application; and
performing, by the application migration system via the one or more hardware processors, automatic migration of the application on the serverless platform along with the allocated number of server instances for the application, wherein the migrated application is configured to run on the serverless platform using the allocated number of server instances.

3. The processor implemented method of claim 2, further comprises:
for each migrated application, performing:
determining, by the application migration system via the one or more hardware processors, whether execution of the migrated application is completed on the serverless platform;
upon determining that the execution is completed, displaying, by the application migration system via the one or more hardware processors, a result of the migrated application on an electronic device; and changing, by the application migration system via the one or more hardware processors, migration status of the application in the system database, wherein the migration status of the application is changed to successfully migrated.

4. The processor implemented method of claim 1, wherein the step of performing, by the application migration system via the one or more hardware processors, the automatic migration of each application present in the suitable application queue to the serverless platform using the infrastructure automation engine comprises:
creating, by the application migration system via the one or more hardware processors, one or more serverless functions for each application present in the suitable application queue, wherein the one or more serverless functions created for each application comprise application code associated with the respective application;
performing, by the application migration system via the one or more hardware processors, tagging of each serverless function of the one or more serverless functions to one of: a virtual network; and an expandable file system;
performing, by the application migration system via the one or more hardware processors, refactoring of the application code present in the one or more serverless functions created for each application for execution on a public cloud environment; and
deploying, by the application migration system via the one or more hardware processors, the one or more serverless functions created for each application on the serverless platform, wherein the serverless platform executes the one or more serverless functions on the public cloud environment associated with a public cloud.

5. The processor implemented method of claim 1, wherein the plurality of parameters comprises one or more of: processing requirement of an application, memory requirement of the application, data size of the application, transfer time requirement of the application, workflow complexity of the application, security requirement of the application, license requirement of the application, user defined parameter associated with the application and service level agreements (SLAs) associated with the application.

6. The processor implemented method of claim 5, wherein the step of determining, by the application migration system via the one or more hardware processors, whether the first application of the one or more applications is eligible for serverless platform migration based on the plurality of parameters of the first application using the machine learning based application qualification model comprises:
accessing, by the application migration system via the one or more hardware processors, one or more operational qualification parameters of the first application from the plurality of parameters, wherein the one or more operational qualification parameters comprises one or more of: processing requirement of the first application, memory requirement of the first application, data size of the first application, transfer time requirement of the first application, workflow complexity of the first application, security requirement of the first application, and license requirement of the first application; and
checking, by the application migration system via the one or more hardware processors, whether the first application is eligible for the serverless platform migration based on the one or more operational qualification parameters of the first application using the machine learning based application qualification model.

7. The processor implemented method of claim 1, further comprises:
upon determining that the first application is not eligible for the serverless platform migration or upon determining that the first application is not executable on the serverless platform, adding, by the application migration system via the one or more hardware processors, the first application in a non-suitable application queue.

8. The processor implemented method of claim 7, further comprises:
for each application present in the non-suitable application queue, performing:
sending, by the application migration system via the one or more hardware processors, the application back to an on premise cluster queue; and
changing, by the application migration system via the one or more hardware processors, migration status of the application in the system database, wherein the migration status of the application is changed to unsuccessful migration.

9. The processor implemented method of claim 1, further comprises:
accessing, by the application migration system via the one or more hardware processors, migration status of each application of the one or more applications from the system database; and
displaying, by the application migration system via the one or more hardware processors, the migration status of each application of the one or more applications on an electronic device.

10. An application migration system, comprising:
a memory storing instructions;
one or more communication interfaces; and
one or more hardware processors coupled to the memory via the one or more communication interfaces, wherein the one or more hardware processors are configured by the instructions to:
receive one or more applications that are to be migrated on a serverless platform and a configuration file associated with each application of the one or more applications, wherein the configuration file associated with each application of the one or more applications comprises a plurality of parameters;
determine suitability of each application of the one or more applications for serverless platform migration by iteratively performing:
determining whether a first application of the one or more applications is eligible for serverless platform migration based on the plurality of parameters of the first application using a machine learning based application qualification model;
upon determining that the first application is eligible for serverless platform migration, computing an execution time of the first application when running on the serverless platform based on the plurality of parameters of the first application using a machine learning based runtime prediction model;
determining whether the first application is executable on the serverless platform based, at least in part, on the computed execution time and one or more permissible limits, wherein the one or more permissible limits are accessed from the configuration file associated with the first application;
upon determining that the first application is executable on the serverless platform, calculating a running cost of the first application on the serverless platform based, at least in part, on the computed execution time and a compute capacity of the serverless platform, wherein the compute capacity of the serverless platform is accessed from a serverless platform configuration file;

storing the running cost of the first application in a system database;

adding the first application in a suitable application queue; and identifying a second application in the one or more applications as the first application, until the suitability of all applications in the one or more applications is determined; and perform automatic migration of each application present in the suitable application queue to the serverless platform using an infrastructure automation engine, where each migrated application is configured to run on the serverless platform.

11. The system of claim 10, wherein the hardware processors are further configured by the instructions to:

for each application present in the suitable application queue, perform:

determine whether an application needs scaling based on an occurrence of at least one event in the respective application;

upon determining that the application needs scaling, determine whether scaling needs to be done for the application based, at least in part, on a running cost of the respective application, and a priority of the respective application and one or more parameters of the plurality of parameters of the respective application using a machine learning based scaling model, wherein the running cost and the priority of the respective application are accessed from the system database;

upon determining that the scaling needs to be done for the application, calculate a number of server instances to be spawned for the application based on the at least one event;

allocate the calculated number of server instances for the application; and perform automatic migration of the application on the serverless platform along with the allocated number of server instances for the application, wherein the migrated application is configured to run on the serverless platform using the allocated number of server instances.

12. The system of claim 11, wherein the hardware processors are further configured by the instructions to:

for each migrated application, perform:

determine whether execution of the migrated application is completed on the serverless platform;

upon determining that the execution is completed, display a result of the migrated application on an electronic device; and change migration status of the application in the system database, wherein the migration status of the application is changed to successfully migrated.

13. The system of claim 10, wherein for performing the automatic migration of each application present in the suitable application queue to the serverless platform using the infrastructure automation engine, the hardware processors are further configured by the instructions to:

create one or more serverless functions for each application present in the suitable application queue, wherein the one or more serverless functions created for each application comprise application code associated with the respective application;

perform tagging of each serverless function of the one or more serverless functions to one of: a virtual network; and an expandable file system;

perform refactoring of the application code present in the one or more serverless functions created for each application for execution on a public cloud environment; and deploy the one or more serverless functions created for each application on the serverless platform, wherein the serverless platform executes the one or more serverless functions on the public cloud environment associated with a public cloud.

14. The system of claim 10, wherein the plurality of parameters comprises one or more of: processing requirement of an application, memory requirement of the application, data size of application, transfer time requirement of the application, workflow complexity of the application, security requirement of the application, license requirement of the application, user defined parameter associated with the application and service level agreements (SLAs) associated with the application.

15. The system of claim 14, wherein for determining whether the first application of the one or more applications is eligible for serverless platform migration based on the plurality of parameters of the first application using the machine learning based application qualification model, the hardware processors are further configured by the instructions to:

access one or more operational qualification parameters of the first application from the plurality of parameters, wherein the one or more operational qualification parameters comprises one or more of: processing requirement of the first application, memory requirement of the first application, data size of the first application, transfer time requirement of the first application, workflow complexity of the first application, security requirement of the first application, and license requirement of the first application; and check whether the first application is eligible for the serverless platform migration based on the one or more operational qualification parameters of the first application using the machine learning based application qualification model.

16. The system of claim 10, wherein the hardware processors are further configured by the instructions to:

upon determining that the first application is not eligible for the serverless platform migration or upon determining that the first application is not executable on the serverless platform, add the first application in a non-suitable application queue.

17. The system of claim 16, wherein the hardware processors are further configured by the instructions to:

for each application present in the non-suitable application queue, perform:

send the application back to an on premise cluster queue; and change migration status of the application in the system database, wherein the migration status of the application is changed to unsuccessful migration.

18. The system of claim 10, wherein the hardware processors are further configured by the instructions to:

access migration status of each application of the one or more applications from the database; and display the migration status of each application of the one or more applications on an electronic device.

19. One or more non-transitory machine-readable information storage mediums comprising one or more instructions which when executed by one or more hardware processors cause:

receiving, by an application migration system, one or more applications that are to be migrated on a serverless platform and a configuration file associated with each application of the one or more applications, wherein the configuration file associated with each application of the one or more applications comprises a plurality of parameters;

determining, by the application migration system, suitability of each application of the one or more applications for serverless platform migration by iteratively performing:

determining, by the application migration system, whether a first application of the one or more applications is eligible for serverless platform migration based on the plurality of parameters of the first application using a machine learning based application qualification model;

upon determining that the first application is eligible for serverless platform migration, computing, by the application migration system, an execution time of the first application when running on the serverless platform based on the plurality of parameters of the first application using a machine learning based runtime prediction model;

determining, by the application migration system, whether the first application is executable on the serverless platform based, at least in part, on the computed execution time and one or more permissible limits, wherein the one or more permissible limits are accessed from the configuration file associated with the first application;

upon determining that the first application is executable on the serverless platform, calculating, by the application migration system, a running cost of the first application on the serverless platform based, at least in part, on the computed execution time and a compute capacity of the serverless platform, wherein the compute capacity of the serverless platform is accessed from a serverless platform configuration file;

storing, by the application migration system, the running cost of the first application in a system database;

adding, by the application migration system, the first application in a suitable application queue; and identifying, by the application migration system, a second application in the one or more applications as the first application, until the suitability of all applications in the one or more applications is determined; and performing, by the application migration system, automatic migration of each application present in the suitable application queue to the serverless platform using an infrastructure automation engine, wherein each migrated application is configured to run on the serverless platform.

\* \* \* \* \*